United States Patent
Ciappa

(10) Patent No.: US 10,027,098 B1
(45) Date of Patent: Jul. 17, 2018

(54) SAFETY COVER FOR USE WITH AND ELECTRICAL CABLE SNAKING DEVICE

(71) Applicant: Charles Ciappa, Seaford, NY (US)

(72) Inventor: Charles Ciappa, Seaford, NY (US)

(*) Notice: Subject to any disclaimer, the term of this patent is extended or adjusted under 35 U.S.C. 154(b) by 0 days.

(21) Appl. No.: 15/584,196

(22) Filed: May 2, 2017

(51) Int. Cl.
*H01R 4/22* (2006.01)
*H02G 3/04* (2006.01)
*H02G 3/22* (2006.01)

(52) U.S. Cl.
CPC ............. *H02G 3/0418* (2013.01); *H02G 3/04* (2013.01); *H02G 3/22* (2013.01)

(58) Field of Classification Search
CPC ...... B60R 16/0222; H02G 3/088; H02G 3/18; H02G 3/22; H02G 3/24; H02G 3/0616; H02G 3/083; H02G 15/003; H02G 15/013; H02G 3/0418; H02G 3/04; H01B 17/00; H01B 17/34
See application file for complete search history.

(56) References Cited

U.S. PATENT DOCUMENTS

| | | | |
|---|---|---|---|
| 2,014,607 A | 9/1935 | Angelo | |
| 2,770,668 A * | 11/1956 | Appleton | H02G 3/0616 174/137 R |
| 3,918,120 A | 11/1975 | Yoshikawa | |
| 4,227,040 A * | 10/1980 | Scott | H01R 4/22 174/87 |
| 4,250,348 A * | 2/1981 | Kitagawa | F16L 5/06 174/652 |
| 5,289,613 A | 3/1994 | Kohl | |
| D346,790 S | 5/1994 | Krehbiel | |
| 5,557,070 A | 9/1996 | Hackney | |
| 5,567,174 A * | 10/1996 | Ericson, Jr. | H01R 13/5205 439/462 |
| 7,354,228 B2 | 4/2008 | Lambert | |
| 7,368,663 B1 * | 5/2008 | Fisher | H02G 15/04 174/74 R |
| 2005/0028307 A1 | 2/2005 | Wu | |
| 2009/0126973 A1 * | 5/2009 | Martin Hernandez | B64D 45/02 174/138 D |

* cited by examiner

Primary Examiner — Pete Lee

(57) ABSTRACT

The safety cover for use with and electrical cable snaking device is a safety barrier that is adapted for use with electrical conduit. The safety cover for use with and electrical cable snaking device is further adapted for use with an electrical panel. The safety cover for use with and electrical cable snaking device is a barrier that prevents a snake from inappropriately entering the interior space of the electrical panel. The safety cover for use with and electrical cable snaking device comprises a cap and a nut. The nut attaches the cap to the electrical panel. The cap physically prevents the entrance of the snake into the interior space of the electrical panel.

1 Claim, 3 Drawing Sheets

SAFETY COVER FOR USE WITH AND ELECTRICAL CABLE SNAKING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of shaping including hand tools and portable power driven tools, more specifically, an accessory for a hand or bench tool not otherwise provided for.

Electrical conduit is a metal tube that is used to protect installed electrical cables from damage. These installed electrical cables are often energized from electrical panels that: 1) draws electrical power from the national electric grid; and, 2) distributes the drawn electrical power through protected electrical circuits into the installed electrical cables that are physically distributed throughout a structure. These electrical circuits are protected using a safety device such as a fuse or a circuit breaker. As described above, the typical electrical panel conducts a large amount of electrical energy that poses a danger to those working around the electrical panel. This is especially true when additional protected electrical circuits are added to the distribution network supplied by the electrical panel. The potential for injury is further increased when circumstances dictate that the additional electrical circuit be added without deenergizing the active circuits already existing within the electrical panel.

This danger is especially acute as one snakes an electrical cable through the electrical conduit from the electric circuit's final location to the electrical panel. The typical process for doing this is to connect the electrical conduit to the electrical panel and then to "fish" a snake through the electrical conduit. For most application, the snake is a bare metal cylindrical device. The snake generally: 1) has enough compressive strength to allow the snake to be pushed through the electrical conduit; and, 2) has adequate flexibility to allow the snake to bend around corners that may be required for the installation of the electrical conduit. Once the snake has been successfully fished, a cord can be threaded through the electrical conduit that allows electrical cables to be pulled through the electrical conduit to the electrical panel.

"Snaking" an electrical conduit is both a frustrating and boring activity. Snaking an electrical conduit is also generally considered a two-person task wherein one person is positioned at each end of the electrical conduit. The first person is responsible for inserting and working the snake through the electrical conduit while the second person observes the distal end of the electrical conduit and informs the first person when the snake has make it through the electrical conduit. The job of the second person is especially important because in most circumstances, the bare metal conductor of the snake appears in an uncontrolled manner directly into the live electrical panel.

This is a potentially dangerous situation. Unfortunately, the frustrating and boring nature of the snaking job leads people to either: 1) not pay attention to the electrical panel; or, 2) determine that snaking the electrical conduit is a one-person job. Either situation presents a danger of both injury and damage.

Clearly a mechanical method to control a snake as it leaves an electrical conduit would be a safety benefit.

SUMMARY OF INVENTION

The present disclosure addresses the dangers described above.

The safety cover for use with and electrical cable snaking device is a safety barrier that is adapted for use with electrical conduit. The safety cover for use with and electrical cable snaking device is further adapted for use with an electrical panel. The safety cover for use with and electrical cable snaking device is a barrier that prevents a snake from inappropriately entering the interior space of the electrical panel. The safety cover for use with and electrical cable snaking device comprises a cap and a nut. The nut attaches the cap to the electrical panel. The cap physically prevents the entrance of the snake into the interior space of the electrical panel.

These together with additional objects, features and advantages of the safety cover for use with and electrical cable snaking device will be readily apparent to those of ordinary skill in the art upon reading the following detailed description of the presently preferred, but nonetheless illustrative, embodiments when taken in conjunction with the accompanying drawings.

In this respect, before explaining the current embodiments of the safety cover for use with and electrical cable snaking device in detail, it is to be understood that the safety cover for use with and electrical cable snaking device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the safety cover for use with and electrical cable snaking device.

It is therefore important that the claims be regarded as including such equivalent construction insofar as they do not depart from the spirit and scope of the safety cover for use with and electrical cable snaking device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
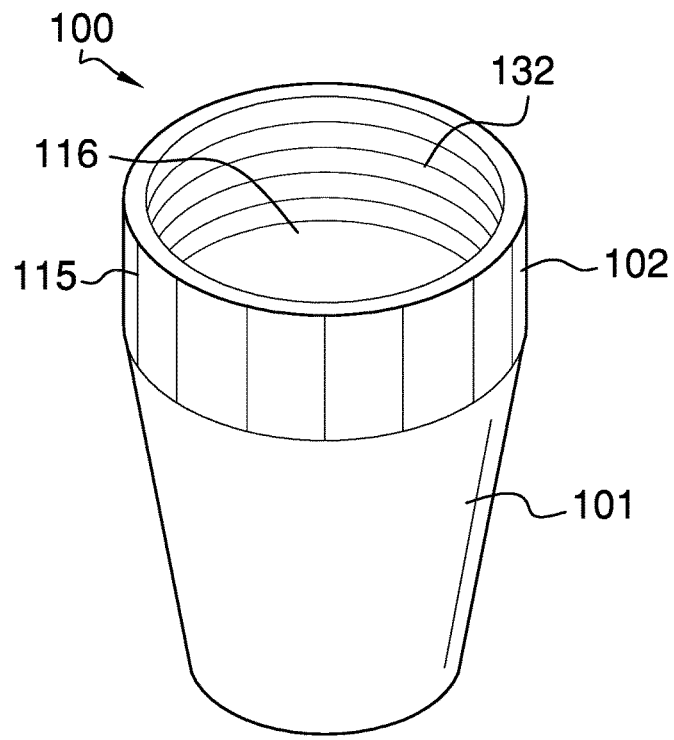
FIG. 1 is a perspective view of an embodiment of the disclosure.
Figure 2:
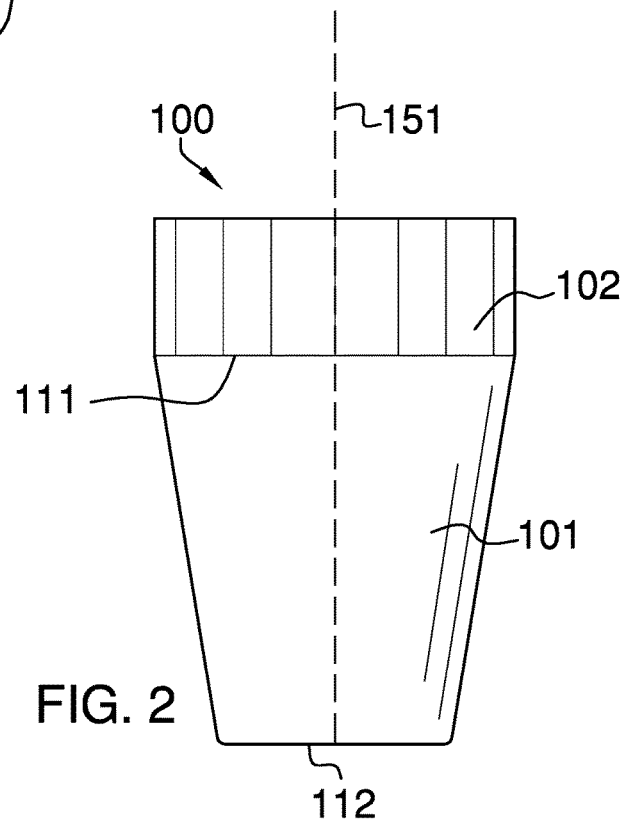
FIG. 2 is a front view of an embodiment of the disclosure.
Figure 3:
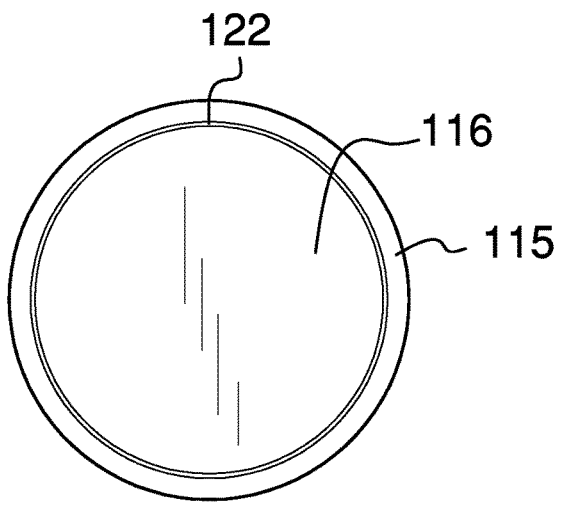
FIG. 3 is a top view of an embodiment of the disclosure.
Figure 4:
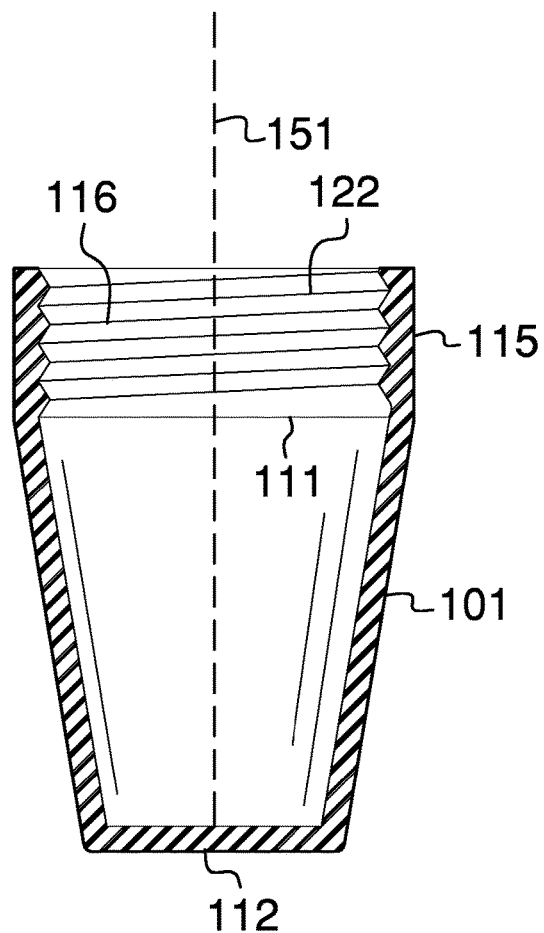
FIG. 4 is a cross-sectional view of an embodiment of the disclosure.
Figure 5:
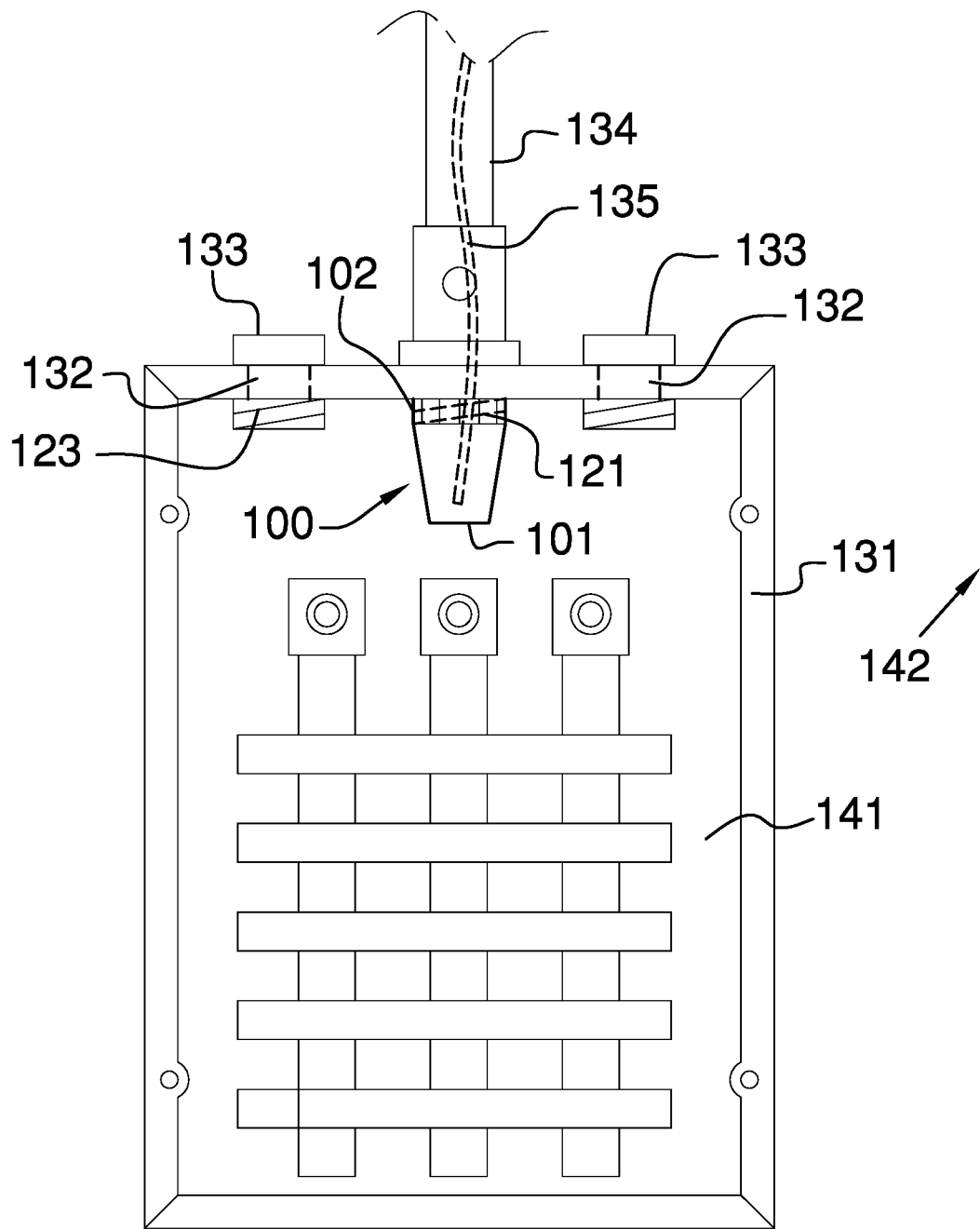
FIG. 5 is an in-use view of an embodiment of the disclosure.

Detailed reference will now be made to one or more potential embodiments of the disclosure, which are illustrated in FIGS. 1 through 5.

The safety cover for use with and electrical cable snaking device 100 (hereinafter invention) is a safety barrier that is adapted for use with electrical conduit 134. The invention 100 is further adapted for use with an electrical panel 131. The invention 100 is a barrier that prevents a snake 135 from entering the interior space 141 of the electrical panel 131. The invention 100 comprises a cap 101 and a nut 102. The nut 102 attaches the cap 101 to the electrical panel 131. The cap 101 will physically prevent the entrance of the snake 135 into the interior space 141 of the electrical panel 131.

In the first potential embodiment of the disclosure, the invention 100 is formed as an integrated single unit. The single unit of the invention 100 is functionally segmented into the cap 101 and the nut 102. For purposes of clarity and simplicity, this disclosure will discuss the cap 101 and the nut 102 as separate units even though the cap 101 and the nut 102 form a single physical structure. Those skilled in the mechanical arts will recognize that this simplifying assumption will not in any way limit the operation of the invention 100 and should not be interpreted to in anyway way to limit the scope of the claims.

The electrical panel 131 is a readily and commercially available electrical distribution structure. The electrical panel 131 is further defined with a knock-out 132, a bushing 133, an interior space 141, and an exterior space 142. The use of an electrical panel 131 is well known and documented. The knock-out 132 is a potential aperture that is formed within the electrical panel 131. The knock-out 132 is discussed in greater detail elsewhere in this disclosure. The bushing 133 is a protective structure that is placed within the knock-out 132. The bushing 133 is discussed in greater detail elsewhere in this disclosure. The interior space 141 refers to the protected space contained within the electrical panel 131. The exterior space 142 refers to any space that is not considered an interior space 141.

The bushing 133 is further defined with an exterior screw thread 123. The exterior screw thread 123 is a screw thread that is formed on the exterior surface of the bushing 133 that is inserted through the knock-out 132 of the electrical panel 131. Exterior screw threads 123 are discussed in greater detail elsewhere in this disclosure.

The cap 101 forms the barrier structure that prevents the snake 135 from entering the interior space 141 of the electrical panel 131. The cap 101 is a hollow structure. The cap 101 is formed in the shape of the frustum of a cone. The parallel planes that forms the frustum are perpendicular to the center axis 151 of the cone structure that forms the cap 101. When the snake 135 enters the cap 101 through the nut 102 the snake 135 is safely contained within the cap 101 where it can do no damage. The base end 111 of the cap 101 is open thereby allowing the snake 135 to enter the cap 101 through the nut 102.

The cap 101 is further defined with a base end 111 and an apex end 112. The cap 101 is further defined with a center axis 151. The base end 111 is the end of the cap 101 that is distal from the apex end 112. The apex end 112 is the end of the cap 101 formed by parallel line selected from the parallel planes that formed the frustum that is closest to what would be the apex of the cone that formed the cap 101.

The nut 102 is a disk 115 shaped structure. An end of the disk 115 structure of the nut 102 attaches to the base end 111 of the cap 101. The nut 102 is a hollow structure that allows the snake 135 to pass through the bushing 133 into the space enclosed by the cap 101. The nut 102 attaches to the bushing 133 of the electrical panel 131 such that the invention 100 is positioned in the interior space 141 of the electrical panel 131.

The nut 102 comprises a disk 115 and a tube 116. The tube 116 is further defined with an interior screw thread 122. The disk 115 is further defined with a center axis 151. The tube 116 is further defined with a center axis 151.

The disk 115 is a disk 115 shaped structure that forms the primary structure of the nut 102. The tube 116 is a cylindrically shaped negative space that is formed through the disk 115 from a first face of the disk 115 to the second face of the disk 115.

The tube 116 is positioned within the disk 115 such that the center axis 151 of the tube 116 is aligned with the center axis 151 of the disk 115. The disk 115 attaches to the base end 111 of the cap 101 such that the center axis 151 of the disk 115 is aligned with the center axis 151 of the cap 101. Stated more directly, the center axes 151 of the cap 101, the disk 115, and the tube 116 are aligned.

The interior screw thread 122 is a screw thread that is formed on the interior surface of the tube 116. Interior screw threads 122 are discussed in greater detail elsewhere in this disclosure. The interior screw thread 122 is sized such that the interior screw thread 122 attaches to the exterior screw thread 123 to form the threaded connection 121.

The invention 100 attaches to the bushing 133 by screwing the interior screw thread 122 on to the exterior screw thread 123 to form the threaded connection 121. The threaded connection 121 is a well-known and documented fastening mechanism that is described in greater detail elsewhere in this disclosure. It is anticipated that the invention 100 will attach to the bushing 133 within the interior space 141 of the electrical panel 131.

To use the invention 100, the nut 102 is attached to the bushing 133 before snaking operations are started. Once the snaking is completed, the invention 100 is removed. It shall be noted that the cap 101 may be made of a clear or translucent material such that you can see the snake 135.

The following definitions were used in this disclosure:

Align: As used in this disclosure, align refers to an arrangement of objects that are: 1) arranged in a straight line; or, 2) arranged to give a directional sense of a plurality of parallel lines.

Bushing: As used in this disclosure, a bushing is a cylindrical pipe structure through which an object is guided and potentially secured. Bushings are often used as protective linings.

Cable: As used in this disclosure, a cable is a collection of insulated wires covered by a protective casing that is used for transmitting electricity or telecommunication signals.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or cone like structure. When the center axes of two cylinder or like structures share the same line they are said to be aligned. When the center axes of two cylinder like structures do not share the same line they are said to be offset.

Cone: As used in this disclosure, a cone is a surface that is generated by rotating a triangle around one of the legs of the triangle. If a line that is perpendicular to the base that is drawn from the center of the base goes through the vertex of the triangle then the cone is called a right cone. A cone is a type of quadric surface. The cone is a pyramid with a circular base.

Cylinder: As used in this disclosure, a cylinder is a geometric structure defined by two identical flat and parallel ends, also commonly referred to as bases, which are circular in shape and connected with a single curved surface, referred to in this disclosure as the face. The cross section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends.

Disk: As used in this disclosure, a disk is a cylindrically shaped object that is flat in appearance.

Exterior: As used in this disclosure, the exterior is use as a relational term that implies that an object is not contained within the boundary of a structure or a space.

Exterior Screw Thread: An exterior screw thread is a ridge wrapped around the outer surface of a tube in the form of a helical structure that is used to convert rotational movement into linear movement.

Frustum: As used in this disclosure, a frustum is a portion of a solid that lies between two parallel planes that intersect with the solid.

Interior: As used in this disclosure, the interior is use as a relational term that implies that an object is contained within the boundary of a structure or a space.

Interior Screw Thread: An interior screw thread is a groove that is formed around the inner surface of a tube in the form of a helical structure that is used to convert rotational movement into linear movement.

Knock-Out: As used in this disclosure, a knock-out is an enclosed surface area (typically circular in shape) that is formed within a sheet metal structure. The perimeter of the knock-out is perforated such that the knock-out may be removed thereby forming an aperture into the interior of the sheet metal structure.

National Electric Grid: As used in this disclosure, the national electric grid is a synchronized and highly interconnected electrical network that distributes energy in the form of electric power from a plurality of generating stations to consumers of electricity.

Negative Space: As used in this disclosure, negative space is a method of defining an object through the use of open or empty space as the definition of the object itself, or, through the use of open or empty space to describe the boundaries of an object.

Nut: As used in this disclosure, a nut is a first object that is formed with an interior screw thread such that a second object with a matching exterior screw thread can screwed into the first object forming a threaded connection.

Ring: As used in this disclosure, a ring is term that is used to describe a flat or plate like structure through which an aperture is formed.

Threaded Connection: As used in this disclosure, a threaded connection is a type of fastener that is used to join a first tube shaped and a second tube shaped object together. The first tube shaped object is fitted with fitted with a first fitting selected from an interior screw thread or an exterior screw thread. The second tube shaped object is fitted with the remaining screw thread. The tube shaped object fitted with the exterior screw thread is placed into the remaining tube shaped object such that: 1) the interior screw thread and the exterior screw thread interconnect; and, 2) when the tube shaped object fitted with the exterior screw thread is rotated the rotational motion is converted into linear motion that moves the tube shaped object fitted with the exterior screw thread either into or out of the remaining tube shaped object. The direction of linear motion is determined by the direction of rotation.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A safety accessory comprising:
   comprises a cap and a nut;
   wherein the safety accessory is further adapted for use with an electrical panel;
   wherein the nut attaches the cap to the electrical panel;
   wherein the safety accessory is a safety barrier;
   wherein the safety accessory is adapted for use with an electrical conduit;
   wherein the safety accessory is adapted for use with a snake wherein the electrical panel is further defined with a knock-out, a bushing, an interior space, and an exterior space;
wherein the bushing is further defined with an exterior screw thread;
wherein the safety accessory physically prevents the entrance of the snake into the interior space of the electrical panel;
wherein the cap is a hollow structure;
wherein the cap is further defined with a base end and an apex end;
wherein the cap is further defined with a cap center axis;
wherein the cap is formed in the shape of the frustum of a cone;
wherein the base end of the cap is open;
wherein the parallel planes that forms the frustum are perpendicular to the cap center axis of the cone structure that forms the cap;
wherein the nut is a disk-shaped structure;
wherein the nut is a hollow structure;
wherein an end of the disk structure of the nut attaches to the base end of the cap;
wherein the nut comprises a disk and a tube;
wherein the tube is a cylindrically shaped negative space that is formed through the disk from a first face of the disk to the second face of the disk;
wherein the tube is further defined with an interior screw thread;
wherein the disk is further defined with a disk center axis;
wherein the tube is further defined with a tube center axis;
wherein the tube further comprises an interior screw thread;
wherein the tube is positioned within the disk such that the tube center axis of the tube is aligned with the disk center axis of the disk;
wherein the disk attaches to the base end of the cap such that the disk center axis of the disk is aligned with the cap center axis of the cap;
wherein the interior screw thread is formed on the interior surface of the tube;
wherein the interior screw thread is sized such that the interior screw thread matches the exterior screw thread of the bushing;
wherein the safety accessory attaches to the bushing within the interior space of the electrical panel;
wherein the disk attaches to the base end of the cap such that the disk center axis of the disk is aligned with the cap center axis of the cap;
wherein the tube of the nut allows the snake to pass through the bushing and through the base end of the cap into a space enclosed by the cap;
wherein the safety accessory attaches to the bushing by screwing the interior screw thread on to the exterior screw thread to form a threaded connection.

* * * * *